US005859306A

United States Patent [19]

Stanforth

[11] Patent Number: 5,859,306

[45] Date of Patent: Jan. 12, 1999

[54] METHOD OF TREATING ARSENIC-CONTAMINATED MATTER USING ALUMINUM COMPOUNDS

[75] Inventor: Robert R. Stanforth, Madison, Wis.

[73] Assignee: RMT, Inc., Madison, Wis.

[21] Appl. No.: 811,164

[22] Filed: Mar. 4, 1997

Related U.S. Application Data

[63] Continuation of Ser. No. 452,172, May 26, 1995, abandoned.

[51] Int. Cl.[6] .............................. A62D 3/00; C09K 17/08; B09B 3/00

[52] U.S. Cl. .......................... 588/236; 588/252; 588/256; 405/129; 405/263

[58] Field of Search .................................... 405/128, 129, 405/263, 236; 588/252, 256, 257

[56] References Cited

U.S. PATENT DOCUMENTS

| | | | |
|---|---|---|---|
| H660 | 8/1989 | Tallent et al. | 252/628 |
| 4,209,335 | 6/1980 | Katayama et al. | 588/238 |
| 4,615,809 | 10/1986 | King | 588/238 |
| 4,668,124 | 5/1987 | Pitts et al. | 405/129 |
| 5,049,285 | 9/1991 | Somerville et al. | 210/710 |
| 5,114,552 | 5/1992 | Schuster | 423/602 |
| 5,196,620 | 3/1993 | Gustin | 588/257 |
| 5,247,122 | 9/1993 | Smith | 588/237 |
| 5,252,003 | 10/1993 | McGahan | 405/128 |
| 5,290,528 | 3/1994 | O'Conner | 405/263 |
| 5,347,077 | 9/1994 | Hooykaas et al. | 588/257 |
| 5,387,740 | 2/1995 | Sasae et al. | 588/257 |
| 5,430,235 | 7/1995 | Hooykaas et al. | 588/252 |
| 5,609,558 | 3/1997 | Sasae et al. | 588/257 |

*Primary Examiner*—Gary P. Straub
*Attorney, Agent, or Firm*—Andrus, Sceales, Starke & Sawall

[57] ABSTRACT

A method of treating arsenic-contaminated matter using an aluminum compound in conjunction with an alkaline buffer, thereby stabilizing the arsenic contained in the contaminated matter and decreasing leaching ability. Preferably, the aluminum compound is a soluble aluminum salt such as aluminum sulfate and the alkaline buffer is magnesium oxide.

10 Claims, No Drawings

METHOD OF TREATING ARSENIC-CONTAMINATED MATTER USING ALUMINUM COMPOUNDS

This application is a continuation of application Ser. No. 08/452,172 filed May 26, 1995 now abandoned.

BACKGROUND OF THE INVENTION

Poor material handling practices of arsenic containing compounds and some on-site disposal has resulted in contamination of soil and groundwater at various sites. Not only is the source of the arsenic in soil due to various industrial waste processes but also from the use of lead arsenic in pesticides which was used in this country from approximately the turn of the century to the 1950's. Arsenic in herbicide manufacturing also generates much arsenic waste and also contributed to much of the contamination.

The arsenic compounds contaminating sites around the U.S. include a number of both arsenate and arsenite salts. However, these contaminated sites also contain other heavy metals, volatile and semivolatile organic compounds, and organic pesticides, notably the organochlorine pesticides.

Arsenic is exceedingly toxic to mammals. Arsenic forms poisonous compounds which, if absorbed by mammals, such as humans, causes various types of cancer, exfoliation and pigmentation of skin, herpes, polyneuritis, hematopoiesis, and degeneration of both the liver and kidneys. Acute symptoms range from irritation of the GI tract which can progress into shock and death.

Remediation of these sites is now necessary given the new Environmental Protection Agency (EPA) laws due to this extreme toxicity. The EPA has developed criteria for classifying wastes or soils as hazardous due to leaching of heavy metals, such as arsenic, in the leaching from contaminated soil. The EPA standard for arsenic leachability and non-waste water matrices is 5 mg per liter (ppm) arsenic in the leachate as measured by the Toxicity Characteristic Leaching Procedure (TCLP) leachate. Ideally, a means to solidify or chemically stabilize the arsenic and other contaminants in the contaminated soil is preferred. Preferably, the method chosen would be suitable for in-situ treatment, and would result in a volume increase of less than 10 percent in the treated soil.

Arsenic exhibits relatively complex behavior due in part to its ability to assume a range of oxidation states (-III, O, III, V) and to form organic as well as inorganic compounds. Arsenic was usually disposed predominantly in the trivalent (III) and pentravalent (V) oxidation states, as arsenite and arsenate compounds. Arsenate forms relatively insoluble compounds with calcium, iron, aluminum and copper, and is strongly adsorbed into iron and aluminum oxides and hydroxides. Arsenite compounds are generally more soluble than arsenate compounds, making arsenite more mobile and having a greater leaching ability and contamination potential. In addition, arsenite is more toxic. It is also adsorbed onto iron and aluminum oxides and hydroxides, although to a lesser degree than arsenate. This is due in part to the markedly different pH-dependence of arsenite and arsenate adsorption. The maximum adsorption for arsenate occurs at pH 4–5, whereas that for arsenite occurs at pH 9. Due to the anionic nature of arsenate and arsenite ions (above pH 9) and the negative charge developed on oxide and hydroxide surfaces under alkaline conditions, adsorption decreases dramatically at higher pH due to electrostatic repulsions.

In the past, in order to eliminate or reduce arsenic contamination, cement stabilization was used. The problem with using cement for arsenic treatment is that it has little or no effect on arsenic stabilization and does not consistently render the soil nonhazardous for arsenic leaching. Cement and cement kiln dust do not stabilize arsenic against leaching by binding it in a cement matrix as once thought. In addition, cement causes an increase in pH wherein the arsenic becomes more soluble. In addition, cement solidifies the soil causing an increase in volume and therefore an increase in cost in disposing the contaminated material. Further, cement treated contaminated soil is difficult to work with due to the change in physical properties resulting from the treatment. For arsenic contaminated soils, cement alone is not effective at doses of even 25 and 50 percent. Tests indicate that cement or cement kiln dust in combination with various salts were not effective at reducing the leachability of arsenic to the desired levels. The samples treated with cement in combination with various salts show the same degree of leachability as those samples to which only pH control additives were applied.

As previously stated, the cement treatments also lead to an increase in volume. The increase in volume for the cement-treated samples is determined by measuring the weight of soil and final volume of the cement treated samples.

The 25 percent cement treatment resulted in a 54 percent increase in volume for the laboratory sample, while the 50 percent treatment resulted in an 82 percent volume increase.

One stabilization approach that can be used is the addition of ferric iron salts as demonstrated by McGaham U.S. Pat. No. 5,252,003 ('033 patent) in which ferric salt in combination with magnesium oxide is used to stabilize arsenate contaminated wastes or soils. However, one problem not addressed by the '033 patent is that the ferric iron may be reduced to ferrous iron in land disposal environments. Ferrous iron is not effective at stabilizing arsenic. The ferrous arsenate salts are much more soluble than the ferric salts. Arsenic may be released into ground water from the treated waste if such a reduction occurs.

Organic binders were also used to stabilize arsenic-contaminated material. Organic binders are also not preferred due to the fact that they also increase volume similar to that of cement and, therefore, increase the cost of eliminating the contaminated material.

SUMMARY OF THE INVENTION

This invention is a method for treatment of solid or semi-solid materials such as soils and sludges containing arsenic compounds in order to stabilize the contaminated material against leaching of arsenic. Specifically, this treatment utilizes aluminum compounds and an alkaline buffer in order to immobilize the arsenic via precipitation and adsorption. Preferably, this invention can be performed as an in situ treatment of arsenic contaminated soil utilizing aluminum sulfate and magnesium oxide.

The aforementioned problems of the prior art, that being the reduction of ferric compounds which result in release of arsenic back into the soil, are avoided using the present invention due to the fact that aluminum doesn't undergo oxidation-reduction reactions. Therefore, aluminum sulfate and a pH buffer combination results in a more effective and long term stable treatment of arsenic contaminated soil than the prior art ferric sulfate-magnesium oxide. In particular, the aluminum sulfate is best suited for applications under anoxic conditions (conditions which are void of oxygen). Conversely, ferric sulfate is better suited under oxic conditions (oxygenated). However, in soil, anoxic conditions are common. Therefore, if the iron treated soil becomes anoxic, the treatment process simply reverses, thereby releasing the arsenic back into the soil or environment. The ability to obtain effective treatment under anoxic conditions is extremely important regarding municipal landfills. In municipal landfills, the conditions are always anoxic and therefore, this invention has superior qualities over the prior art in municipal applications.

This invention is also especially effective against arsenate. However, if arsenite is found in a contaminated matter, it may be oxidized to form arsenate prior to treatment. An example of how to oxidize the soil is via hydrogen peroxide.

An example of a chemical reaction within the scope of this invention can be shown as follows:

$$Al_2(SO_4)_3+Na_3HAsO_4\rightarrow 2AlAsO_4+3Na_2SO_4$$

The resulting arsenic stabilization is two-fold, utilizing both adsorption as well as precipitation. The aluminum arsenate product precipitates and therefore stabilizes the arsenic. The "alum" or aluminum sulfate also forms aluminum hydroxide which coprecipitates or adsorbs the arsenic, resulting in additional arsenic stabilization. Therefore, it is a combination of the $AlAsO_4$ plus arsenic adsorbing on the surface of aluminum hydroxide and getting trapped in a resulting matrix.

It is an object of the present invention to provide a method for treatment of materials such as soils or sludges containing arsenic compounds.

Further, an object of this invention is to render soil or waste that is hazardous for arsenic non-hazardous under TCLP tests.

Another object of the invention is to stabilize the material such as soil or sludges against leaching of arsenic in the natural environment.

Another object of the invention is to provide a convenient and inexpensive treatment. This is achieved primarily because the chemicals and equipment required to utilize the method of this invention are commercially available and relatively inexpensive and therefore make utilizing the method of this invention more convenient.

A further object of the invention is to result in minimal increase in the volume of the treated contaminated soil.

Still another object of this invention is to provide a method for treatment acceptable under the Synthetic Precipitation Leaching Procedure (SPLP) Test as well as the Multiple Extraction Procedure (MEP).

DETAILED DESCRIPTION OF THE PREFERRED EMBODIMENT

The form of arsenic contemplated within the scope of this invention can be organic or inorganic arsenicals. Examples of inorganic arsenicals may include, but is not limited to, arsenic acid and arsenic oxides. The organic arsenicals may include methane arsenicals such as mono-methyl sodium arsenate, $Na(CH_3)AsO_2OH$, cacadylic acid, dichloropheny-larsine and diethylarsine.

The contaminated soil or sludge to be treated will vary in consistency and composition. Also, the level of soil or sludge moisture may vary greatly. Sludge may consist of sedimentated or filtered waste product consisting of a thick viscous mass. Whether the treatment is for contaminated soil or contaminated sludge, the process of using this method is basically the same. The aluminum sulfate and the alkaline buffer is simply added to the soil (or sludge) and thoroughly mixed. It is especially beneficial if the soil has enough moisture to dissolve and subsequently form the products of the reaction, aluminum hydroxide and aluminum arsenate.

The preferred embodiment of this invention is the use of aluminum sulfate. However, other aluminum compounds may be utilized including aluminum chloride or any soluble aluminum salt or sodium aluminate.

The alkaline buffer used in this invention could be either magnesium oxide, magnesium hydroxide or a reactive form of calcium carbonate or calcium magnesium carbonate or any other suitable buffer that has the ability to buffer between pH 5 and 10. Since aluminum sulfate is an acid, the alkaline base is necessary to neutralize the acid and it is essential that this alkaline base therefore keep the pH in the appropriate range for forming the aluminum arsenate.

Soil Samples

All three soil samples tested were TCLP toxic for arsenic. The three soil samples (Sample Borings 1, 2 and 3 or "SB-1", "SB-2" and "SB-3") were supplied to the RMT Applied Chemistry Laboratory by S. S. Papadopulos and Associates. The samples were homogenized, and then sub-samples were taken for the initial testing. Both TCLP (SW-846 Method 1311) and compositional analysis were performed on all three samples. On the basis of the results of the compositional and TCLP testing, the majority of the subsequent testing was on sample SB-1, since this sample had high compositional arsenic (24,000 mg/kg) and leached fairly high concentrations of arsenic in the TCLP test (150 mg/L). SB-2 had lower compositional arsenic, and so less work was done on that sample. SB-3 was used as a confirmation sample for the treatment process, since in terms of compositional arsenic, Sb-3 was similar to SB-1.

EXAMPLE 1

The testing performed on the samples was designed to determine what was in the samples and the leaching potential for those materials. The primary element of concern as arsenic. Leaching was evaluated in several ways. The Toxicity Characteristic Leaching Procedure [TCLP test, Method 1311 in SW-846], 55 Fed. Reg. 126, pgs. 26,986–998 (1990) is used by the USEPA for classifying wastes as hazardous. The test is designed to simulate the leaching potential of an actively degrading municipal landfill. As such, the TCLP test may not provide a realistic evaluation of the leaching potential of a waste disposed in an area other than a municipal landfill. An alternative test that can be used to ml leaching under less severe environments than a municipal landfill is the Synthetic Precipitation Leaching Procedure (SPLP, Method 1312, SW-846), which uses a simulated acid rain leaching solution. The leaching solution for the SPLP test is much less buffered than either of the two solutions used in the TCLP test; thus, it provides a less aggressive leaching medium. To model long-term leaching from a waste, the USEPA uses a serial elution leaching test, the Multiple Extraction Procedure (MEP). The original MEP was designed using the EP Toxicity test followed by nine elutions with a simulated acid rain. Since the time that the MEP was originally designed, the EPA has replaced the EP Toxicity test with the TCLP test, and has redesigned the simulated acid rain step to use the SPLP test. The MEP test procedure has not officially been updated, however.

Analytical laboratory procedures were done according to the USEPA protocols outlined in SW-846. However, a few analytical laboratory procedures were done using other protocol, most notably moisture content, which was done using ASTM Method D-2216-80. MEP tests were run using a standard TCLP test for the first elution, followed by nine successive elutions using the SPLP leaching solution.

For the treatability screening tests, a modified TCLP procedure was used to facilitate testing a large number of samples. The screening test uses one-tenth of the amounts of solid and liquid used in the standard test. The leaching solution used is chosen on the basis of knowledge of the waste and additives. If there is a question about which solution to use, either the TCLP pretest is run on the sample or both solutions are used. The samples are tumbled for 18 hours (±2 hours) on the standard TCLP tumbler, and are then filtered through a 0.45 $\mu$m filter. The filtrate is then analyzed directly without the normal digestion step. Arsenic was analyzed on graphite furnace AA.

The screening TCLP test uses one tenth of the prescribed sample weight and reagent volume, and a screening metals analysis in the laboratory, with no digestion or matrix spikes. The results are for screening purposes only. The procedure does not fulfill the requirements of the standard TCLP test.

Some screening SPLP tests were also conducted. The screening SPLP is similar to the screening TCLP test except that the SPLP leaching solution is used.

A number of treatment test additives can be used. For pH control, CaO (also contributes calcium ion) and MgO were added.

Aluminum addition was in the form of aluminum sulfate (alum) and CaO or MgO. Another additive may be copper sulfate.

With the exception of the solidified samples, the treatment additives were introduced into the bottle used for the screening TCLP test. The samples were mixed, but no extra water was added until the TCLP test solution was run. Normally, the screening TCLP test was run within a few minutes of mixing the treatment additive with the soil.

The solidified samples were prepared by mixing the soil with the additives. Water was added to form a cement-like slurry. The samples were cured for seven days. The samples were then pulverized to pass through the sieve used in the TCLP test. The screening TCLP test was performed on the pulverized material.

All additive weights are based on the wet weight of soil and the dry weight of additive, since the TCLP test is run on a wet weight basis. The weight of additive used is based on the weight of soil, not on the weight of the mixture (i.e., a 10 percent dose is the equivalent of 10 g additive per 100 g soil [wet]).

Soil Characterization Prior To Stabilization

The results of the soil characterization are given in Tables 1 and 2. SB-1 and SB-3 contained 24,000 to 23,000 mg/kg of arsenic, respectively. Sample SB-2 had a lower arsenic concentration at 6,600 mg/kg (see Table 1).

TABLE 1

TREATABILITY STUDY SOILS COMPOSITIONAL METALS

| Parameter | SB-1 (mg/kg) | SB-2 (mg/kg) | SB-3 (mg/kg) |
|---|---|---|---|
| Arsenic | 24,000 | 6,600 | 23,000 |

All three samples leached arsenic above the hazardous waste criterion in the TCLP test. SB-1 leached 150 mg/L, SB-2 leached 240 mg/L, and SB-3 leached 550 mg/L in the TCLP tests (see Table 2).

TABLE 2

TREATABILITY STUDY SOILS TCLP METALS

| Parameter | TCLP Criteria* (mg/L) | SB-1 (mg/L) | SB-2 (mg/L) | SB-3 (mg/L) |
|---|---|---|---|---|
| Arsenic | 5.0 | 150 | 240 | 550 |

*40 CRF 261.24
NS No Standard

The other metals were all below their respective hazardous waste criteria. Sample SB-3 contained higher levels of volatile compounds and organochlorine pesticides than did the other two soils.

In summary, all three soils were hazardous for arsenic.

Soil Characterization After Stabilization

In order to determine whether the arsenic in the soil samples was in the arsenate or arsenite form, several samples were oxidized with hydrogen peroxide, and then treated. If the arsenic were in the arsenate form initially, then the peroxide treatment should have little influence on the treatment test results. If a significant portion of the arsenic were in a reduced form (e.g., arsenite), then the peroxide oxidation should improve the treatment testing results. The results for both the unoxidized and oxidized samples are very similar, indicating that the arsenic is primarily in the arsenate form in the soil.

pH Control

Calcium oxide and magnesium oxide were added to samples SB-1 and SB-2 to determine the influence of pH on the leaching behavior of arsenic. Arsenic concentrations for both soils decrease as the pH increases; however, arsenic concentrations do not drop below 5 mg/L in the screening test until a lime dose of 20 percent is used and the pH is raised to 12.5. Under the conditions of the test, the solubility was not reduced sufficiently by the formation of relatively insoluble compounds (e.g., calcium arsenate) to render the soil nonhazardous.

Aluminum Addition

Aluminum can adsorb or precipitate arsenic, in a manner similar to ferric iron salts. The removal mechanism for arsenic is most likely adsorption onto aluminum hydroxide particles with coprecipitation of aluminum hydroxide and aluminum arsenate also occurring. Arsenic adsorption onto aluminum hydroxide decreases under very alkaline conditions due to electrostatic repulsion. Therefore, aluminum treatment is therefore most effective under mildly acidic to mildly basic conditions, namely pH from approximately 5 to 10. Several dosages of aluminum were tested on both soils SB-1 (see Table 3) and SB-2 (see Table 4). The results indicate that aluminum can reduce arsenic to around the 3 to 5 mg/L range. In order to confirm that the soil did not contain arsenite, the soil was oxidized with hydrogen peroxide prior to aluminum treatment. Treatment effectiveness was not improved by oxidizing the soil with peroxide, again indicating that there was no arsenite in the soil.

TABLE 3

| SCREENING TEST RESULTS - ALUMINUM TREATMENT - SB-1 | | |
|---|---|---|
| SAMPLE<br>Soil SB-1 | $pH_1$ | Arsenic (mg/L) |
| Untreated | 5.0 | 150 |
| + 2.5% $Al_2(SO_4)_3$ | 4.91 | 5.6 |
| + 5% $Al_2(SO_4)_3$ | 4.79 | 3.2 |
| + 2.5% MgO & 2.5% $Al_2(SO_4)_3$ | 4.70 | 14 |
| + 2.5% MgO & 5% $Al_2(SO_4)_3$ | 4.58 | 8.7 |
| + 5% MgO & 5% $Al_2(SO_4)_3$ | 5.75 | 33 |
| + 7.5% MgO & 5% $Al_2(SO_4)_3$ | 8.57 | 4.8 |
| + 7.5% MgO & 7.5% $Al_2(SO_4)_3$ | 8.37 | 2.5 |
| + 5% MgO & 10% $Al_2(SO_4)_3$ | 5.03 | 3.8 |
| + 7.5% MgO & 10% $Al_2(SO_4)_3$ | 7.29 | 3.2 |
| + 10% MgO & 10% $Al_2(SO_4)_3$ | 8.40 | 4.9 |
| AFTER PEROXIDE TREATMENT | | |
| + 7.5% MgO & 5% $Al_2(SO_4)_3$ | 8.57 | 6.5 |
| + 7.5% MgO & 7.5% $Al_2(SO_4)_3$ | 8.37 | 3.9 |

$pH_1$ = Final pH in screening test.

TABLE 4

| SCREENING TEST RESULTS - ALUMINUM TREATMENT - SB-2 | | |
|---|---|---|
| SAMPLE<br>Soil SB-2 | $pH_1$ | Arsenic (mg/L) |
| Untreated | | |
| + 2.5% $Al_2(SO_4)_3$ | 4.94 | 14 |
| + 5% $Al_2(SO_4)_3$ | 4.77 | 8.3 |
| + 2.5% MgO & 2.5% $Al_2(SO_4)_3$ | 4.59 | 17 |
| + 2.5% MgO & 5% $Al_2(SO_4)_3$ | 4.58 | 9.0 |
| + 5% MgO & 5% $Al_2(SO_4)_3$ | 6.80 | 4.4 |

$pH_1$ = Final pH in screening test.

Other Stabilizing Agents

Copper sulfate may be incorporated as a treatment additive. Copper arsenate is highly insoluble (less soluble than ferric arsenate), and the copper sulfate may effectively reduce arsenic leaching.

I claim:

1. A method for the treatment of arsenate-contaminated solids resulting in stabilization of said arsenate-contaminated solids against leaching of arsenic comprising:

adding an aluminum compound selected from the group consisting of aluminum sulfate, aluminum chloride and sodium aluminate and an alkaline pH adjusting substance selected from the group consisting of calcium oxide, magnesium oxide, magnesium hydroxide, calcium carbonate and calcium magnesium carbonate to arsenic contaminated matter, wherein said aluminum compound comprises about 2.5% to about 15% by weight and said pH adjusting substance comprises about 2.5% to about 10% by weight, based on the weight of the arsenic matter; and mixing said aluminum compound, alkaline pH adjusting substance and arsenate contaminated solids to form a reaction mixture which has a pH level between pH 5 and pH 10 and precipitate a stabilized, non-leachable aluminum-arsenate complex the treated solids containing said aluminate arsenate complex, having an arsenic concentration below approximately 5 mgs per liter as determined by the TCLP test.

2. The method of claim 1 wherein said soluble aluminum salt is aluminum sulfate.

3. The method of claim 1 wherein said soluble aluminum salt is aluminum chloride.

4. The method of claim 1 wherein said alkaline pH adjusting substance is magnesium oxide.

5. The method of claim 1 wherein said alkaline pH adjusting substance is a reactive form of calcium carbonate.

6. The method of claim 1 wherein said alkaline pH adjusting substance is a reactive form of calcium magnesium carbonate.

7. The method of claim 1 wherein said alkaline buffer is magnesium hydroxide.

8. The method of claim 1, wherein the solids initially contain inorganic arsenic values other than arsenate, oxidizing said values to arsenate with hydrogen peroxide, prior to the addition of the aluminum compound and the pH adjusting substance.

9. The method of claim 1, wherein the solids initially contain organic arsenic values other than arsenate, oxidizing said values to arsenate with hydrogen peroxide, prior to the addition of the aluminum compound and the pH adjusting substance.

10. The method of claim 1 wherein said aluminum compound is aluminum sulfate and said alkaline pH adjusting substance is magnesium oxide.

* * * * *

UNITED STATES PATENT AND TRADEMARK OFFICE

CERTIFICATE OF CORRECTION

PATENT NO. : 5,859,306

DATED : January 12, 1999

INVENTOR(S) : Robert R. Stanforth

It is certified that error appears in the above-indentified patent and that said Letters Patent is hereby corrected as shown below:

IN THE CLAIMS:

| | |
|---|---|
| Claim 7, col. 8, line 1 | Delete the word "buffer" and substitute therefor the phrase ---pH adjusting substance--- |

Signed and Sealed this

Twenty-sixth Day of October, 1999

*Attest:*

Q. TODD DICKINSON

*Attesting Officer* *Acting Commissioner of Patents and Trademarks*